United States Patent
Murata et al.

(10) Patent No.: US 9,563,208 B2
(45) Date of Patent: Feb. 7, 2017

(54) POSITIONER

(71) Applicant: Azbil Corporation, Tokyo (JP)

(72) Inventors: Kouichirou Murata, Tokyo (JP); Yousuke Inagaki, Tokyo (JP)

(73) Assignee: AZBIL CORPORATION, Tokyo (JP)

( * ) Notice: Subject to any disclaimer, the term of this patent is extended or adjusted under 35 U.S.C. 154(b) by 122 days.

(21) Appl. No.: 14/641,634

(22) Filed: Mar. 9, 2015

(65) Prior Publication Data

US 2015/0261225 A1    Sep. 17, 2015

(30) Foreign Application Priority Data

Mar. 11, 2014    (JP) ................... 2014-047228

(51) Int. Cl.
| | | |
|---|---|---|
| F16K 37/00 | (2006.01) | |
| G05D 7/06 | (2006.01) | |
| F16K 31/12 | (2006.01) | |
| G05B 11/01 | (2006.01) | |
| G05B 15/02 | (2006.01) | |
| F15B 5/00 | (2006.01) | |
| F15B 20/00 | (2006.01) | |
| F15B 21/04 | (2006.01) | |

(52) U.S. Cl.
CPC ............ *G05D 7/0676* (2013.01); *F15B 5/006* (2013.01); *F16K 31/12* (2013.01); *F16K 37/0025* (2013.01); *G05B 11/01* (2013.01); *G05B 15/02* (2013.01); *F15B 20/00* (2013.01); *F15B 21/045* (2013.01); *F15B 2211/6306* (2013.01); *F15B 2211/6313* (2013.01); *F15B 2211/6336* (2013.01)

(58) Field of Classification Search
CPC .................................................. F16K 37/0066
USPC ..................... 251/129.01, 129.04; 137/487.5
See application file for complete search history.

(56) References Cited

U.S. PATENT DOCUMENTS

| | | |
|---|---|---|
| 8,641,009 B2 | 2/2014 | Inagaki |
| 8,955,821 B2 | 2/2015 | Okuda et al. |
| (Continued) | | |

FOREIGN PATENT DOCUMENTS

| | | |
|---|---|---|
| JP | D1128492 | 12/2001 |
| JP | 2011210158 A | 10/2011 |
| JP | 2012-207756 | 10/2012 |

OTHER PUBLICATIONS

Extended European Search Report dated Aug. 17, 2015 issued in corresponding European Patent Application No. 15158333.3.

*Primary Examiner* — Michael R Reid
*Assistant Examiner* — Paul J Gray
(74) *Attorney, Agent, or Firm* — Troutman Sanders LLP

(57) ABSTRACT

A positioner is provided with a control calculating portion 1 including first and second calculating portions. The first calculating portion, a valve opening detecting portion, and a first pressure sensor are contained in a first case. The second calculating portion, an electropneumatic converting portion, a pneumatic circuit portion, and a second pressure sensor are contained in a second case. The first case is assembled together with the valve, and the second case is located in a position away from the valve. Output signals from the first calculating portion, which are a control signal MV (a PWM signal) and a detected pressure signal S1' (wherein a detected pressure signal S1 has been converted into a digital signal, are sent to the second calculating portion through cables 16.

4 Claims, 6 Drawing Sheets

(56) References Cited

U.S. PATENT DOCUMENTS

2003/0183791 A1* 10/2003 Meinhof ............... F16K 31/126
                                                    251/129.04
2011/0245982 A1   10/2011 Inagaki
2012/0248356 A1   10/2012 Okuda et al.

* cited by examiner

FIG. 2

|  | Single-Unit Type | Conventional Separated Type | Calculating/Pneumatic Separated Type |
|---|---|---|---|
| Positional Relationship between the Valve and the First Pressure Sensor | Good: Near | Good: Near | Good: Near |
| Structure/Size | Bad: Large, Complex | Good: Small | Very Good: Small, Simple Structure |
| Noise | Good: Same As Conventional | Bad: Week | Good: Same As Conventional |
| Cables | Good: Not Required | Bad: Added | Good: Digital Communication/Wireless |

POSITIONER

CROSS REFERENCE TO RELATED APPLICATION

This application claims priority under 35 U.S.C. §119 to Japanese Patent Application No. 2014-047228, filed on Mar. 11, 2014, the entire content of which being hereby incorporated herein by reference.

FIELD OF TECHNOLOGY

The present disclosure relates to a positioner for controlling the opening of a valve.

BACKGROUND

Conventionally, positioners for controlling the openings of valves have been, for example, positioners wherein the critical components have been configured as illustrated in FIG. 4, for example. See, for example, Japanese Unexamined Patent Application Publication No. 2012-207756. In this figure, 100 is a higher-level device, 200 (200A) is a positioner, and 300 is a regulator valve.

The positioner 200A is provided with a control calculating portion 1, an electropneumatic converting portion 2, a pneumatic circuit portion 3, and a valve opening detector (valve opening detecting portion) 4, assembled together with a valve 300. In the below, this positioner 200A will be termed a "single-unit positioner."

In this single-unit positioner 200A, the valve opening detector 4 detects the current degree of opening of the valve 300, and sends it as an actual opening signal Xpv to the control calculating portion 1. The control calculating portion 1 uses, as inputs, the opening setting signal Xsp for the valve 300, sent from the higher-level device, and the actual opening signal Xpv, from the valve opening detector 4, to calculate the difference between the opening setting signal Xsp and the actual opening signal Xpv, and generates, and sends to the electropneumatic controlling portion 2, a PWM signal (a pulse width modulation signal), obtained through performing PID control calculations on this difference, as a control signal MV.

The electropneumatic converting portion 2 converts into an air pressure (a nozzle back pressure) Pn the control signal MV from the control calculating portion 1. The pneumatic circuit portion 3 uses the pneumatic signal Pn from the electropneumatic converting portion 2 as an input air pressure and amplifies this input air pressure Pn to produce an output air pressure Po, and outputs it to the operating device (not shown) of the valve 300. Doing so causes the air of the air pressure Po to flow into a diaphragm chamber within the operating device, to adjust the opening of the valve 300.

Note that the control calculating portion 1 is provided with a function for performing diagnostics on the valve 300, based on the changes in the control state, and for sending the diagnostic results to the higher-level device 100. This valve diagnostic function makes it possible to stabilize the operations in the plant and to achieve a reduction in maintenance costs. FIG. 5 illustrates one example of a positioner 200 wherein diagnostics are performed on the valve 300 based on changes in air pressure.

In this positioner 200 (200B), a first pressure sensor 5 and a second pressure sensor 6 are provided, where the air pressure Po (the pressure of the output air that flows into the diaphragm chamber of the operating device) from the pneumatic circuit portion 3 in the valve 300 is detected by the first pressure sensor 5, and the output air pressure Po to the valve 300 from the pneumatic circuit portion 3 is detected by the second pressure sensor 6, where the air pressures detected by the first pressure sensor 5 and the second pressure sensor 6 are sent to the control calculating portion 1 as detected air pressure signals S1 and S2. The control calculating portion 1 performs diagnostics on the valve 300 based on the detected air pressure signal S1, sent from the first pressure sensor 5, and the detected air pressure signal S2, sent from the second pressure sensor 6. For example, an air leak is detected from the differences in the air pressures between the air pressure detected by the first pressure sensor 5 and the air pressure detected by the second pressure sensor 6.

In this single-unit positioner 200B that is provided with the diagnostic function based on air pressure, the control calculating portion 1, the electropneumatic converting portion 2, the pneumatic circuit portion 3, the valve opening detector 4, the first pressure sensor 5, and the second pressure sensor 6 are contained within a single case 10, where this case 10 is assembled together with the valve 300. Because of this, there is a difficulty in that there is a susceptibility to the effects of vibrations of the valve 300 and a sensitivity to the temperature of the fluid that flows through the valve 300.

Given this, in order to reduce the susceptibility to the effects of vibration and temperature, a positioner 200 (200C) is envisioned wherein, as illustrated in FIG. 6, the case 10 is divided into a first case 10-1 and a second case 10-2, wherein the valve opening detector 4 and the first pressure sensor 5 are contained within the first case 10-1, and assembled together with the valve 300, where the control calculating portion 1, the electropneumatic converting portion 2, the pneumatic circuit portion 3, and the second pressure sensor 6 are contained within the second case 10-2 and disposed at a location that is away from the valve 300. See, for example, Japanese Design Registration No. 1128492. In the below, this positioner 200C will be termed a "separated-type positioner."

Note that the actual opening signal Xpv from the valve opening detector 4 and the detected pressure signal S1 from the first pressure sensor 5, contained within the first case 10-1, are sent to the control calculating portion 1 through the provision of a terminal block 7 in the second case 10-2, where this terminal block 7 and the valve opening detector 4 are connected through cables 16-1 and 16-2.

However, in this separated-type positioner 200C, the actual opening signal Xpv (which is a weak analog current signal) from the valve opening detector 4, and the detected pressure signal S1 (which is a weak analog current signal) from the pressure sensor 5 are susceptible to the effects of noise due to the cable 16-1 that extends between the valve opening detector 4 and the control calculating portion 1 and of the cable 16-2 that extends between the pressure sensor 5 and the control calculating portion 1. This causes problems such as the following to occur.

(1) The effects on control are large due to performing control calculations using the actual opening signal Xpv, which is susceptible to the effects of noise.

(2) The effects on the diagnostic results are large due to performing diagnostics on the valve 300 using the detected pressure signal S1, which is susceptible to the effects of noise.

(3) It is necessary to test the noise at the terminal because the control calculating portion 1 is connected to the valve opening detector 4 and the pressure sensor 5 by the cables 16-1 and 16-2 through the terminal block 7. Additionally, performing surge protection, and the like, at the terminal requires the positioner to be larger. There is also the possibility that the signal itself will be affected through the additional components after surge protection.

(4) Noise testing must be performed on the signal lines for the actual opening signal Xpv and the detected pressure signal S1, which transmit minute changes.

(5) Because the valve opening detector 4 and the pressure sensor 5 are separated from the control calculating portion 1, temperature correction on the valve opening detector 4 and the pressure sensor 5 is difficult.

(6) While there is no need for an anti-explosive structure in the second case 10-2 if it is placed in a safety zone, doing so requires the cables 16-1 and 16-2 between the terminal block 7 and the valve opening detector 4 and the pressure sensor 5 to be longer, increasing the effects of noise on the actual opening signal Xpv and the detected pressure signal S1.

The present invention was created to solve such a problem, and an aspect thereof is to provide a positioner that is robust to the effects of noise.

SUMMARY

In order to achieve such an aspect set forth above, the present invention is a positioner including: a control calculating portion that inputs an opening setting signal for a valve, sent from a higher-level device, and an actual opening signal expressing the current opening of the valve, and generates a control signal from the opening setting signal and the actual opening signal; an electropneumatic converting portion that converts the control signal from the control calculating portion into an air pressure; a pneumatic circuit portion that uses, as an input air pressure, an air pressure that has been converted by the electropneumatic converting portion, for amplifying this input air pressure to form an output air pressure, and outputs this output air pressure to the valve; and a valve opening detecting portion that detects the current opening of the valve to produce an actual opening signal for the control calculating portion. The positioner further includes: a first calculating portion and a second calculating portion, which structure the control calculating portion; a first pressure sensor that detects an output air pressure from the pneumatic circuit portion at the valve; a second pressure sensor that detects an output air pressure from the pneumatic circuit portion to the valve or an input air pressure from the electropneumatic converting portion to the pneumatic circuit portion; a first case that contains the first calculating portion, the valve opening detecting portion, and the first pressure sensor; and a second case that contains the second calculating portion, the electropneumatic converting portion, the pneumatic circuit portion, and the second pressure sensor, wherein: the first case is assembled together with the valve; and the second case is located in a position away from the valve;. The first calculating portion inputs an opening setting signal that is sent from the higher-level device, an actual opening signal that is sent from the valve opening detecting portion, and a detected pressure signal from the first pressure sensor. The second calculating portion inputs an output signal from the first calculating portion, and a detected pressure signal from the second pressure sensor.

In the present invention, the control calculating portion is structured from a first calculating portion and a second calculating portion, where the first calculating portion, the valve opening detecting portion, and the first pressure sensor are contained within the first case, and the second calculating portion, the electropneumatic converting portion, the pneumatic circuit portion, and the second pressure sensor are contained within the second case, where the first case is combined with the valve and the second case is located away from the valve. Moreover, the first calculating portion inputs the opening setting signal that is sent from the higher-level device, the actual opening signal that is sent from the valve opening detecting portion, and the detected pressure signal from the first pressure sensor, and the second calculating portion inputs a signal outputted from the first calculating portion and the detected pressure signal from the second pressure sensor. Although, in this structure, an output signal is sent from the first calculating portion, which is contained within the first case, to the second calculating portion, which is contained within the second case, this output signal can be formed, through the first calculating portion, into a signal that is not susceptible to the effects of noise, such as a digital signal or a strong analog signal.

Additionally, as one example configuration, in the first calculating portion, generating, and sending, to the second calculating portion, the control signal, based on the opening setting signal that is sent from the higher-level device and the actual opening signal that is sent from the valve opening detecting portion, and also performing, in the second calculating portion, diagnostics on the valve based on a detected pressure signal from the first pressure sensor, sent through the first calculating portion, and a detected pressure signal from the second pressure sensor, may be considered.

Additionally, as one example configuration, in the first calculating portion, generating, and sending, to the second calculating portion, the control signal, based on the opening setting signal that is sent from the higher-level device and the actual opening signal that is sent from the valve opening detecting portion, while, in the second calculating portion, performing diagnostics on the valve based on a detected pressure signal from the second pressure sensor and a detected pressure signal from the first pressure sensor, may be considered.

Additionally, as one example configuration, in the first calculating portion generating, and sending to the second calculating portion, a control signal based on an opening setting signal, sent from the higher-level device, an actual opening signal, sent from the valve opening detecting portion, a detected pressure signal from the first pressure sensor, and a detected pressure signal from the second pressure sensor, may be considered.

In the present invention, the first calculating portion and the second calculating portion are calculating portions that structure the control calculating portion, and the division of responsibilities, into the first calculating portion and the second calculating portion, for the control calculating portion, may be performed with flexibility.

In the present invention, the control calculating portion is structured from a first calculating portion and a second calculating portion, wherein the first calculating portion, the valve opening detecting portion, and the first pressure sensor are contained within a first case, and the second calculating portion, the electropneumatic converting portion, the pneumatic circuit portion, and the second pressure sensor are contained in a second case, where the first case is combined with the valve and the second case is placed in a location away from the valve, and an output signal such as a digital signal or a strong analog signal, is sent from the first calculating portion, contained within the first case, to the second calculating portion, contained within the second case, thereby making it possible to reduce the susceptibility to the effects of noise.

BRIEF DESCRIPTIONS OF THE DRAWINGS

FIG. 2 is a diagram showing comparisons of various aspects of a conventional positioner that is provided with a pressure sensor (a "single-unit positioner" and a "conventional separated-type positioner") and a positioner according to the present invention.

DETAILED DESCRIPTION

Figure 1:
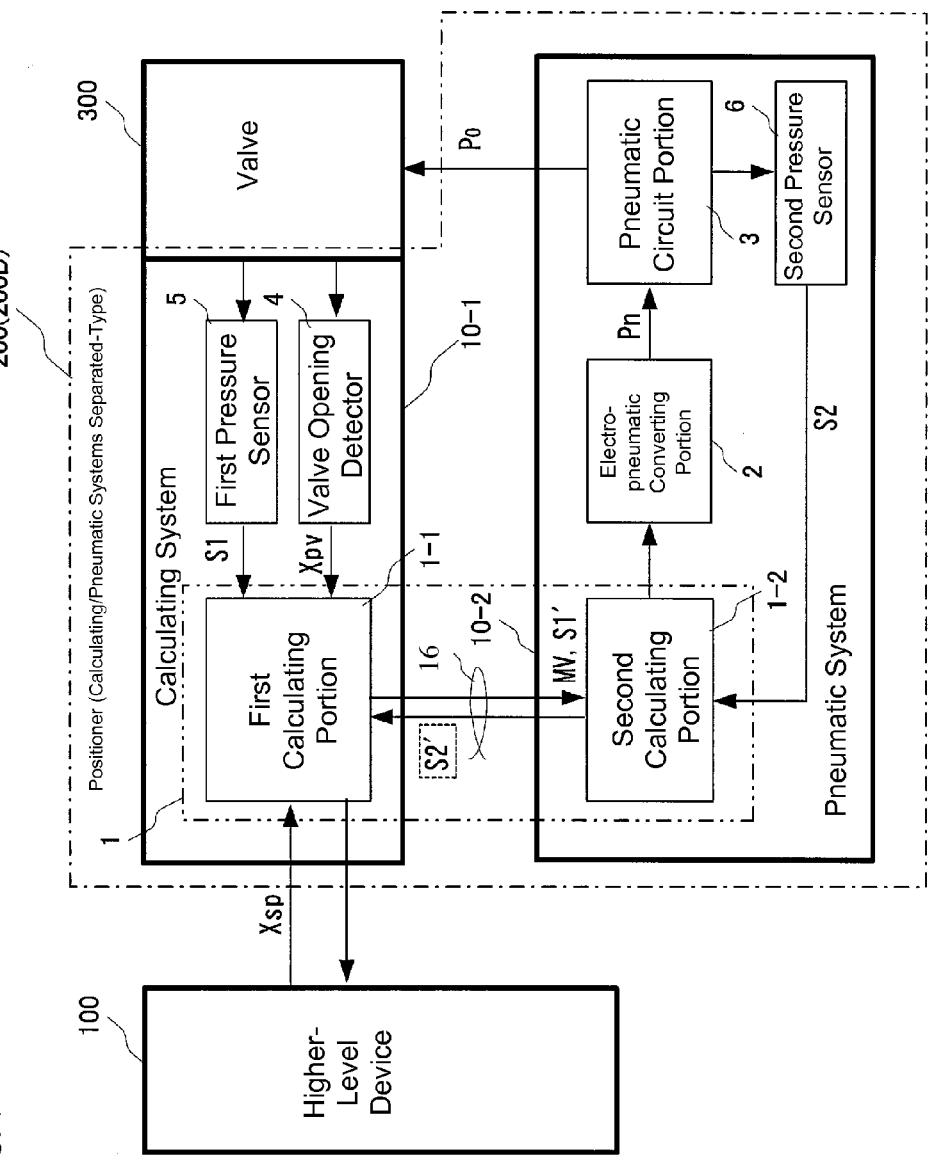
FIG. 1 is a structural diagram illustrating the critical portions in an example of a positioner according to the present disclosure.

Examples according to the present disclosure will be explained below in detail, based on the drawings. FIG. 1 is a structural diagram illustrating the critical portions in an example of a positioner according to the present disclosure. In this figure, the structural elements that are identical or equivalent to the structural elements explained in reference to FIG. 6 are indicated by codes that are identical to those of FIG. 6, and explanations thereof are omitted.

In a positioner 200 (200D) according to the present example, the control calculating portion 1 is structured from a first calculating portion 1-1 and a second calculating portion 1-2, where the first calculating portion 1-1, a valve opening detector (valve opening detecting portion) 4, and a first pressure sensor 5 are contained within a first case 10-1, and the second calculating portion 1-2, an electropneumatic converting portion 2, a pneumatic circuit portion 3, and a second pressure sensor 6 are contained within a second case 10-2.

Moreover, the first case 10-1, which contains the first calculating portion 1-1, the valve opening detector 4, and the first pressure sensor 5, is assembled together with the valve 300, and the second case 10-2, which contains the second calculating portion 1-2, the electropneumatic converting portion 2, the pneumatic circuit portion 3, and the second pressure sensor 6, is placed in a position away from the valve 300.

Figure 6:
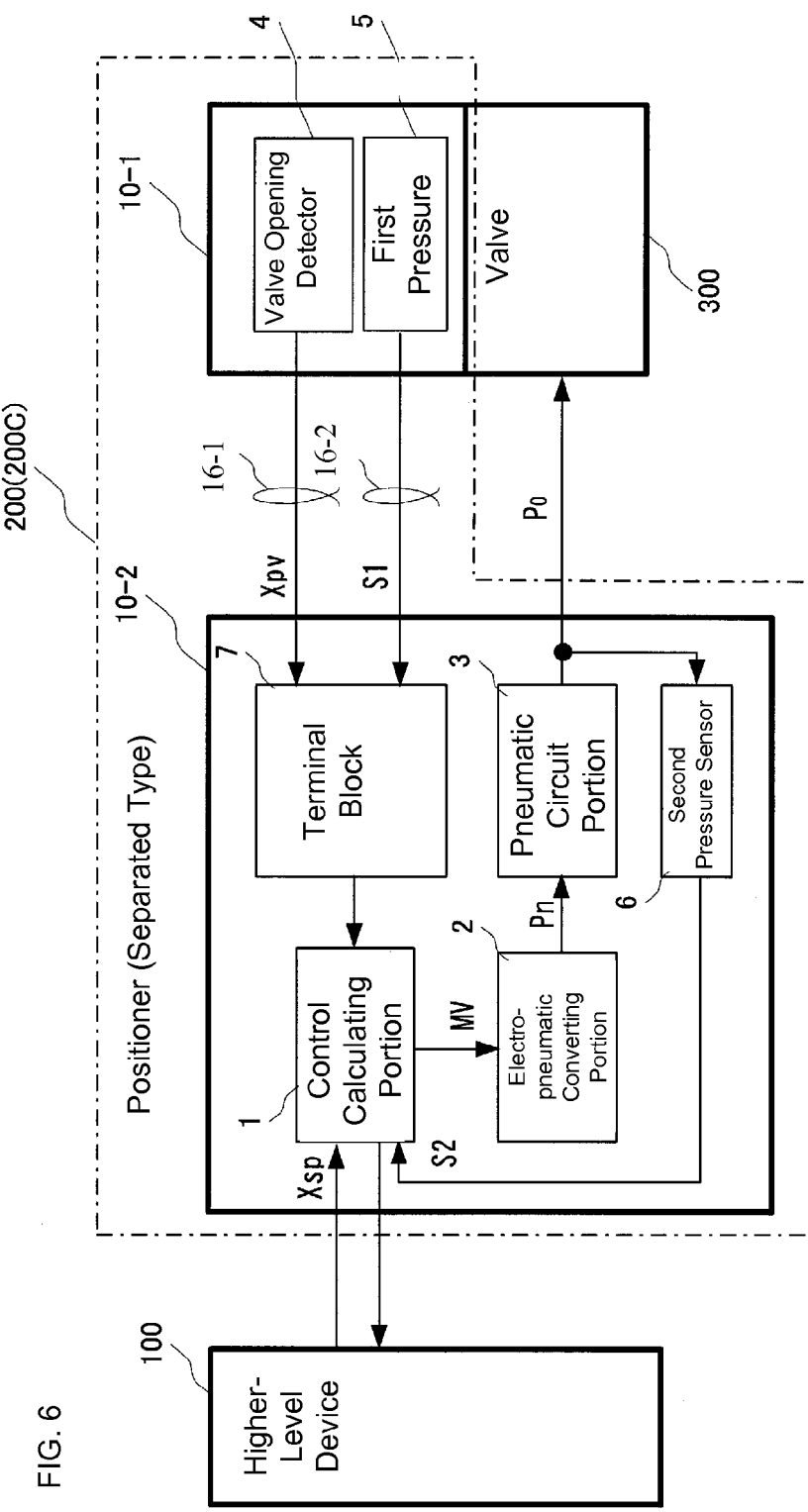
FIG. 6 is a diagram illustrating an example structure for a conventional separate-type positioner that is equipped with a pressure sensor.

While this positioner 200D is also a separated-type positioner positioner, as is the positioner 200C illustrated in FIG. 6, the first calculating portion 1-1, the valve opening detector 4, and the first pressure sensor 5, which are the calculating system, is contained in the first case 10-1, where the second calculating portion 1-2, the electropneumatic converting portion 2, the pneumatic circuit portion 3, and the second pressure sensor 6, which are the pneumatic system, are contained in the second case 10-2, so the calculating system and the pneumatic system are separated.

That is, in the positioner 200D, the calculating system and the pneumatic system are cut off from each other, where the calculating system is assembled together with the valve 300, and the pneumatic system is located in a position away from the valve 300. Note that in the first case 10-1 and the second case 10-2, the various components are supplied power from respective separate power supplies.

Moreover, in this positioner 200D, the opening setting signal Xsp, sent from the higher-level device 100, the actual opening signal Xpv, sent from the valve opening detector 4, and the detected pressure signal S1, sent from the first pressure sensor 5, are inputted into the first calculating portion 1-1, and the output signal from the first calculating portion 1-1 (that is, a control signal MV and a detected pressure signal S1' (wherein the detected pressure signal S1 has been converted into a digital signal)), and the detected pressure signal S2 from the second pressure sensor 6, are inputted into the second calculating portion 1-2.

In this case, the output signals from the first calculating portion 1-1 (the control signal MV and the detected pressure signal S1') are sent from the first case 10-1 side to the second case 10-2 side, instead of the actual opening signal Xpv from the valve opening detector 4 and the detected pressure signal S1 from the first pressure sensor 5. That is, the output signals from the first calculating portion 1-1 (that is, the control signal MV and the detected pressure signal S1') are sent through the cable 16 from the first calculating portion 1-1 to the second calculating portion 1-2.

These output signals (the control signal MV and the detected pressure signal S1') that are sent through the cable 16 are digital signals, that is, the control signal MV is a PWM signal (a pulse width modulation signal), and the detected pressure signal S1' is the detected pressure signal S1 that has been converted into a digital signal, and thus they are robust to noise.

Note that while in this example the output signals from the first calculating portion 1-1 (the control signal MV and the detected pressure signal S1') are sent through the cable 16 to the second calculating portion 1-2, that is, while the output signals from the first calculating portion 1-1 (the control signal MV and the detected pressure signal S1') are sent to the second calculating portion 1-2 through a physical cable, they may be sent via radio instead. Moreover, the output signals (the control signal MV and the detected pressure signal S1') from the first calculating portion 1-1 need not necessarily be digital signals, but may instead be strong analog signals.

When the output signals from the first calculating portion 1-1 (the control signal MV and the detected pressure signal S1') are sent, then, in the second calculating portion 1-2, the control signal MV is sent to the electropneumatic converting portion 2, while, on the other hand, diagnostics are performed on the valve 300 based on the detected pressure signal S1', that is, the detected pressure signal S1 from the first pressure sensor 5 that has been converted into a digital signal, and on the detected pressure signal S2 from the second pressure sensor 6. In this example, air leak detection is performed based on the difference between the air pressure detected by the first pressure sensor 5 and the air pressure detected by the second pressure sensor 6. The diagnostic result by the second calculating portion 1-2 is sent through the cable 16 to the first calculating portion 1-1, to be sent from the first calculating portion 1-1 to the higher-level device 100. Note that the diagnostic results by the second calculating portion 1-2 may be, for example, displayed on the positioner 200D.

This positioner 200D also produces other effects, such as the following. This positioner 200D is referred to below as a "calculating/pneumatic system-separated positioner."

(1) Because the valve opening detector 4 and the calculating portion 1-1 are assembled together into a single unit, there is no need for a long signal line for the actual opening signal Xpv that would be susceptible to the effects of noise.

(2) Because the pressure sensor 5 and the calculating portion 1-1 are assembled together into a single unit, there is no need for a long signal line for the detected air pressure signal S1 that would be susceptible to the effects of noise.

(3) There is no need for noise testing on lines that would transmit minute changes, enabling noise prevention performance with countermeasures similar to those that are conventional.

(4) The development lead time is shortened and the development cost is reduced through reducing the number of issues requiring noise testing.

(5) Miniaturization is facilitated through having only the valve opening detector 4, the pressure sensor 5, and the calculating portion 1-1, with robustness to vibration similar to that of the conventional separated type.

(6) Because the valve opening detector 4, the pressure sensor 5, and the calculating portion 1-1 are located together, temperature correction for the valve opening detector 4 and the pressure sensor 5 can be performed accurately.

(7) An anti-explosive structure is possible through resin molding of the valve opening detector 4, the pressure sensor 5, and the calculating portion 1-1 alone.

(8) The calculating portion 1-2, the electropneumatic converting portion 2, the pneumatic circuit portion 3, and the pressure sensor 6 can be located in a safety zone, eliminating the need for an anti-explosive structure for these parts, enabling a reduction in costs.

Figure 5:
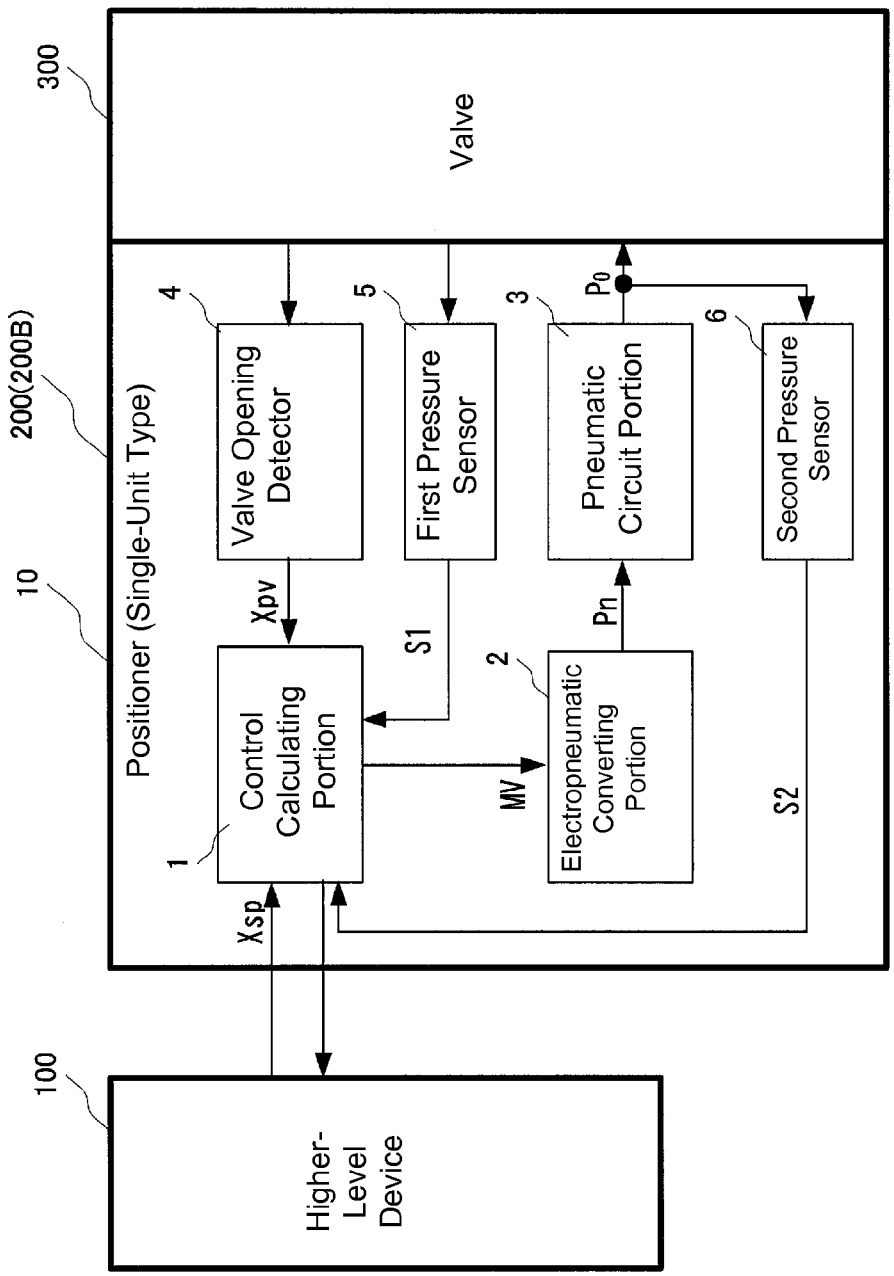
FIG. 5 is a diagram illustrating an example structure for a conventional single-unit positioner that is equipped with a pressure sensor.

In FIG. 2, with the conventional single-unit positioner 200B (FIG. 5) listed as "Single-Unit Type," and the conventional separated-type positioner 200C (FIG. 5) listed as "Conventional Separated Type," various attributes are compared for the case of the "Calculating/Pneumatic Separated Type" of the positioner 200D of the present example (FIG. 1).

Figure 3:
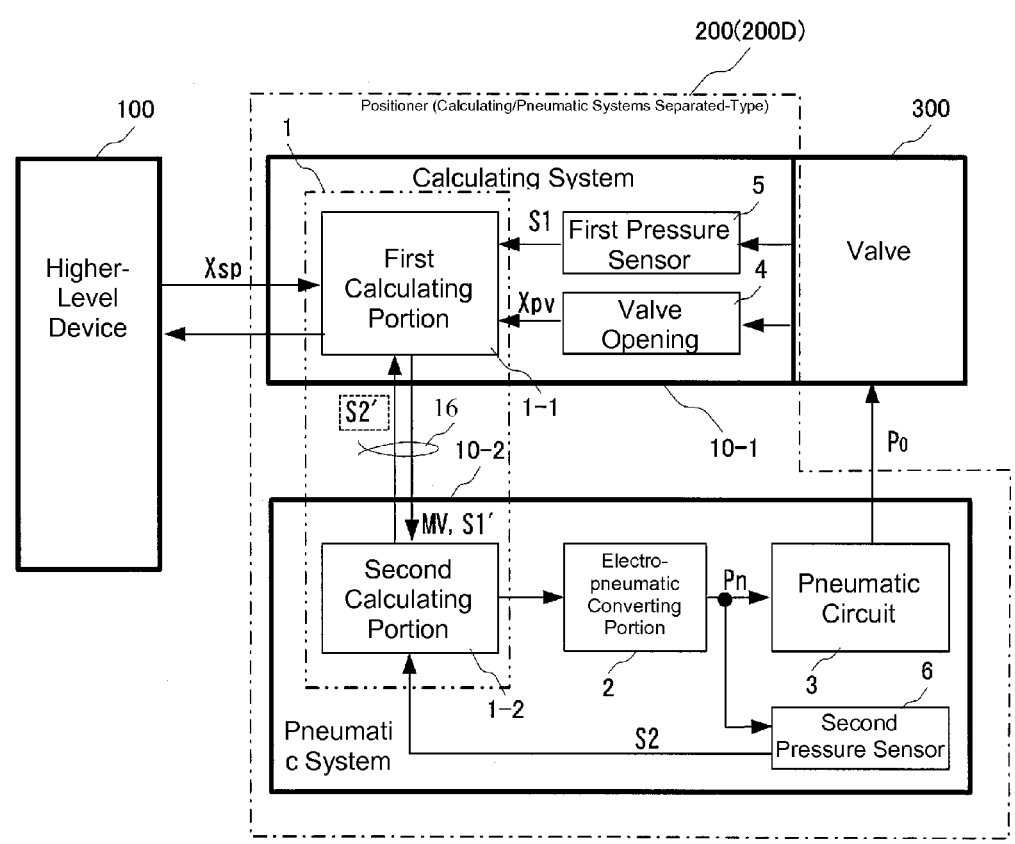
FIG. 3 is a diagram showing an example wherein the input air pressure Pn, inputted into the pneumatic circuit portion from the electropneumatic converting portion, is the air pressure detected by the second pressure sensor.
Figure 4:
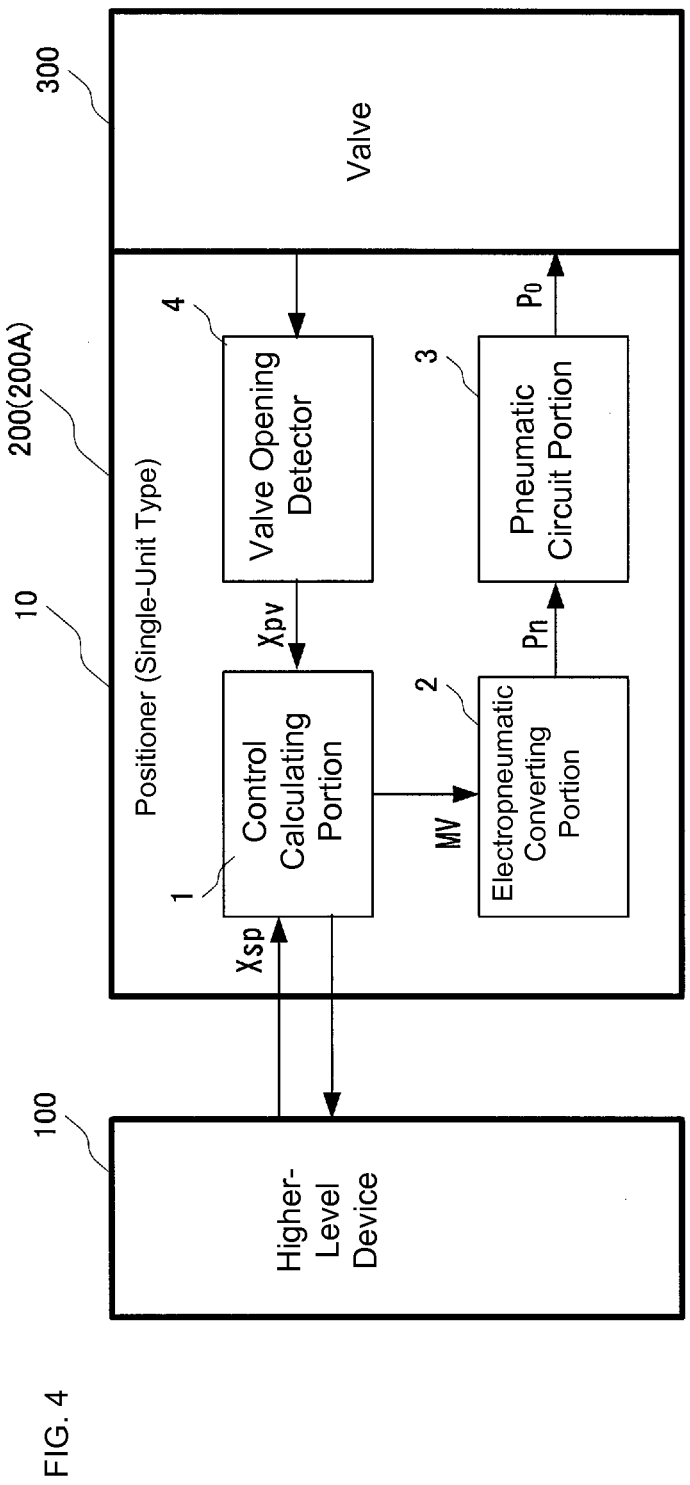
FIG. 4 is a diagram illustrating the structure in a conventional single-unit positioner.

Note that while in the example set forth above the output air pressure Po from the pneumatic circuit portion 3 to the valve 300 was detected by the second pressure sensor 6, the input air pressure Pn, into the pneumatic circuit portion 3 from the electropneumatic converting portion 2, may be detected instead, with the detected air pressure sent to the second calculating portion 1-2 as the detected air pressure signal S2, as illustrated in FIG. 3.

Moreover, while, in the example set forth above, diagnostics were performed in the second calculating portion 1-2 on the valve 300 based on the detected pressure signal S1' from the first calculating portion 1-1 (the detected pressure signal S1 that has been converted into a digital signal) and on the detected pressure signal S2 from the second pressure sensor 6, the diagnostics on the valve 300 may instead be performed in the first calculating portion 1-1 based on a detected pressure signal S2' from the second calculating portion 1-2 (where the detected pressure signal S2 has been converted into a digital signal) and on the detected pressure signal S1 from the first pressure sensor 5.

Moreover, in the first calculating portion 1-1, high-speed control may be performed through the use of PID control calculations when calculating the control signal MV from the detected pressure signal S1, from the first pressure sensor 5, and the detected pressure signal S2', from the second calculating portion 1-2. Moreover, the control signal MV may be calculated through executing PID control calculations on the difference between the opening setting signal Xsp and the actual opening signal Xpv in the second calculating portion 1-2 instead, and the division of responsibilities, into the first calculating portion 1-1 and the second calculating portion 1-2, for the control calculating portion 1, may be performed with flexibility.

FURTHER EXAMPLES

While the present disclosure has been explained above in reference to examples, the present disclosure is not limited to the examples set forth above. The structures and details in the present disclosure may be varied in a variety of ways, as can be understood by one skilled in the art, within the scope of technology in the present disclosure.

The invention claimed is:
1. A positioner comprising:
a control calculating portion that inputs an opening setting signal for a valve, sent from a higher-level device, and an actual opening signal expressing the current opening of the valve, and generates a control signal from the opening setting signal and the actual opening signal;
an electropneumatic converting portion that converts the control signal from the control calculating portion into an air pressure;
a pneumatic circuit portion that uses, as an input air pressure, an air pressure that has been converted by the electropneumatic converting portion, for amplifying this input air pressure to form an output air pressure, and outputs this output air pressure to the valve;
a valve opening detecting portion that detects the current opening of the valve to produce the actual opening signal for the control calculating portion;
a first calculating portion and a second calculating portion, which structure the control calculating portion;
a first pressure sensor that detects an output air pressure from the pneumatic circuit portion at the valve;
a second pressure sensor that detects an output air pressure from the pneumatic circuit portion to the valve or an input air pressure from the electropneumatic converting portion to the pneumatic circuit portion;
a first case that contains the first calculating portion, the valve opening detecting portion, and the first pressure sensor; and
a second case that contains the second calculating portion, the electropneumatic converting portion, the pneumatic circuit portion, and the second pressure sensor,
wherein:
the first case is assembled together with the valve;
the second case is located in a position away from the valve;
the first calculating portion inputs an opening setting signal that is sent from the higher-level device, the actual opening signal that is sent from the valve opening detecting portion, and a detected pressure signal from the first pressure sensor; and
the second calculating portion inputs an output signal from the first calculating portion, and a detected pressure signal from the second pressure sensor.
2. The positioner as set forth in claim 1, wherein:
the first calculating portion generates, and sends to the second calculating portion, the control signal, based on the opening setting signal that is sent from the higher-level device and the actual opening signal that is sent from the valve opening detecting portion; and
the second calculating portion performs diagnostics on the valve based on the detected pressure signal from the first pressure sensor, sent through the first calculating portion, and the detected pressure signal from the second pressure sensor.

3. The positioner as set forth in claim 1, wherein:
the first calculating portion generates, and sends to the second calculating portion, the control signal, based on the opening setting signal that is sent from the higher-level device and the actual opening signal that is sent from the valve opening detecting portion, and also performs diagnostics on the valve based on the detected pressure signal from the second pressure sensor, sent through the second calculating portion, and the detected pressure signal from the first pressure sensor.

4. The positioner as set forth in claim 1, wherein:
the first calculating portion generates, and sends to the second calculating portion, the based on the opening setting signal, sent from the higher-level device, the actual opening signal, sent from the valve opening detecting portion, the detected pressure signal from the first pressure sensor, and the detected pressure signal from the second pressure sensor.

* * * * *